United States Patent Office.

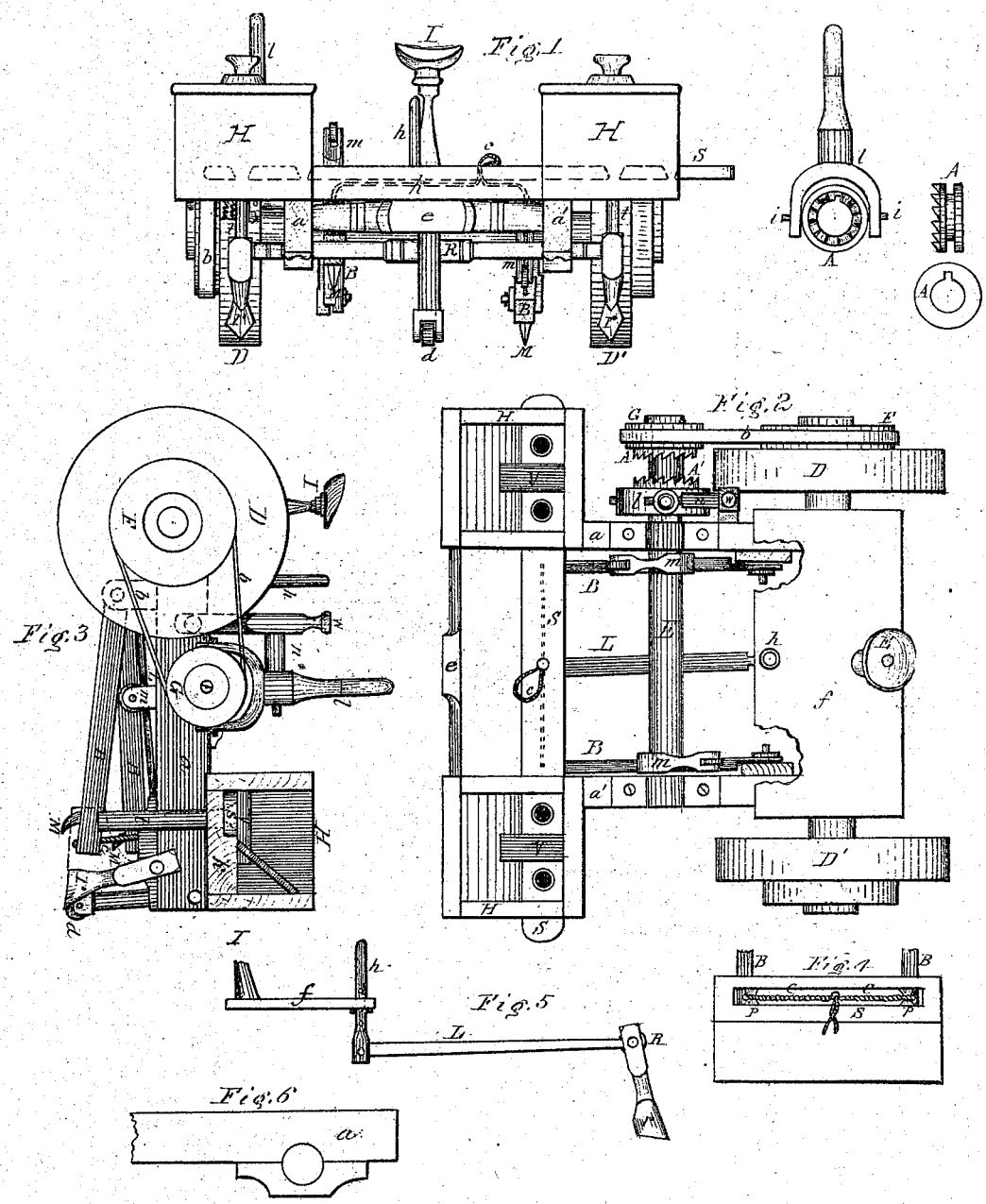

JOSEPH A. McCLURE, OF MOUNT CARROLL, ILLINOIS.

Letters Patent No. 105,473, dated July 19, 1870.

IMPROVED CORN-PLANTER.

The Schedule referred to in these Letters Patent and making part of the same

---

I, JOSEPH A. McCLURE, of Mount Carroll, in the county of Carroll and State of Illinois, have invented certain Improvements in Corn-Planters, of which the following is a specification.

Nature and Objects of the Invention.

This invention consists in the combination and arrangement of certain devices, by which the main driving-wheels of the machine are made to operate the seed-slide, dropping the corn in two rows, at regular intervals, and, at the same time, to operate the markers, by which the points for dropping the succeeding rows are designated, so that the corn may be planted in straight rows each way.

My invention consists, also, in the peculiar method of adjusting the plows or furrow-openers, so as to make the furrows deep or shallow.

It consists, also, in the peculiar arrangement of devices for throwing the machine into or out of operative condition.

Description of the Accompanying Drawing.

Figure 1 is a front elevation.
Figure 2, a top view.
Figure 3, a side elevation.
Figure 4, 5, and 6. detached portions of some of the machinery.

The main frame, consisting of the side pieces $a$ $a'$, and cross-piece $e$, with the platform $f$, rests upon the two driving-wheels D D', and upon the supporting-wheel $d$, placed in front.

The seed-hoppers H H rest upon the front ends of the side pieces $a$ $a'$, the plank $k$, which forms the bottom of each hopper, extending across the frame, from outside to outside of the hoppers.

This plank is cut away to form the bed for the seed-slide S, as shown in fig. 3, and has a longitudinal slot, as shown in fig. 4, in which are inserted the pulleys $p$ $p$ and cord $c$ $c$, for operating the markers M M.

The slide S has two seed-pockets or thimbles in each end, which may be larger or smaller according to the seed used.

The cut-off rubbers V V regulate the number of kernels dropped at each hill.

To operate the seed-slide S, I place the revolving shaft E about the middle of the machine, and connect it with the driving-wheel D by means of pulleys G and F and band $b$, or substitute chain and drivers instead of the pulleys and band.

To the shaft E I attach the cams $m$ $m$, in such a manner as to act alternately upon the treadles B B, which treadles are connected with the seed-slide S by means of the cords or chains $c$ $c$, working over the pulleys $p$ $p$.

Upon the revolution of the driving-wheel D and shaft E, the seed-slide is moved from one side to the other, two of the seed-pockets being over the seed-spouts $t$ $t$ at the same time, and dropping two hills at each vibration of the slide.

To the under side of the treadles B B, near the front ends, I attach the markers M M, by means of which the ground is marked off in such a manner as to guide the dropping of the succeeding rows, the markers making short furrows, alternately, about four feet in length, the ends of which will designate the points at which the next two rows are to be dropped. By this means the rows may be made straight each way, so that the corn can be easily cross-plowed.

To better control the marking out and dropping of the corn, I attach the clutch A A' to the shaft E.

The part A is on the pulley G, and the other part, A', is provided with a key-seat to slide over a feather upon the shaft E, and has a groove in the periphery for the pins $i$ $i$ in the lower end of the pronged lever $l$. By means of the pronged lever $l$ and the clutch A A' the machine can at any time be thrown out of or into operative condition, and the marking and dropping completely regulated.

$r$ $r$ are plows, or furrow-openers, which go before the seed-spouts, and prepare the furrow for the corn.

These plows are attached to the rock-shaft R, and are raised or lowered by means of the handle $h$, attached to the lever L, which extends from the lower end of the handle $h$ into the rock-shaft R.

The plows are adjusted to the required depth by placing a pin through the handle, under the edge of the platform $f$.

Fig. 6 shows the manner in which the axle of the driving-wheels D D' supports the bed-pieces $a$ $a'$.

The axle may be made to revolve, if desirable.

In fig. 3, $w$ is an upright post, secured to the side piece $a$, and has the arm $n$, which supports the pronged lever $l$.

The front part of the machine may be supported by two wheels instead of the one, $d$.

It will be seen, by the foregoing description, that one person, occupying the seat I, can control the whole operation of dropping the seed for two rows of corn, and, at the same time, marking the ground for the succeeding rows.

The driving-wheels D D', following after the seed-spouts, directly behind, will effectually cover up the corn, and roll the furrows compactly over it.

I claim—

1. The combination of the seed-slide S, treadles B B, cords or chains $c$ $c$, cams $m$ $m$, shaft E, and driving-wheel D, all operating substantially as set forth.

2. The markers M M, attached to the treadles B B, substantially as and for the purpose described.

3. The upright handle $h$, lever L, and rock-shaft R, in combination with the furrow-openers $r$ $r$, for adjusting the latter, substantially as specified.

JOSEPH A. McCLURE.

Witnesses:
N. DU BOIS,
R. DU BOIS.